US010907233B2

(12) United States Patent
Han et al.

(10) Patent No.: US 10,907,233 B2
(45) Date of Patent: Feb. 2, 2021

(54) HOT-DIP GALVANIZED STEEL SHEET AND HOT-DIP GALVANNEALED STEEL SHEET WITH EXCELLENT AGING RESISTANCE PROPERTIES AND BAKE HARDENABILITY, AND METHOD FOR MANUFACTURING SAME

(71) Applicant: POSCO, Pohang-si (KR)

(72) Inventors: Sang-Ho Han, Gwangyang-si (KR); Je-Woong Lee, Gwangyang-si (KR)

(73) Assignee: POSCO, Pohang-si (KR)

(*) Notice: Subject to any disclaimer, the term of this patent is extended or adjusted under 35 U.S.C. 154(b) by 314 days.

(21) Appl. No.: 15/743,490

(22) PCT Filed: Jun. 16, 2016

(86) PCT No.: PCT/KR2016/006398
§ 371 (c)(1),
(2) Date: Jan. 10, 2018

(87) PCT Pub. No.: WO2017/018659
PCT Pub. Date: Feb. 2, 2017

(65) Prior Publication Data
US 2018/0202020 A1  Jul. 19, 2018

(30) Foreign Application Priority Data
Apr. 5, 2016  (KR) .................. 10-2016-0041648

(51) Int. Cl.
C23C 2/06 (2006.01)
C22C 38/04 (2006.01)
(Continued)

(52) U.S. Cl.
CPC .............. C21D 9/46 (2013.01); B32B 15/013 (2013.01); C21D 6/002 (2013.01); C21D 6/005 (2013.01);
(Continued)

(58) Field of Classification Search
None
See application file for complete search history.

(56) References Cited

U.S. PATENT DOCUMENTS 5,690,755 A * 11/1997 Yoshinaga .......... C21D 8/0436
148/320
6,743,600 B1    6/2004 Tou et al.
(Continued)

FOREIGN PATENT DOCUMENTS

CN    1353755      6/2002
CN    101688277    3/2010
(Continued)

OTHER PUBLICATIONS

English translation of JP2009-035818 form EPO printed Jan. 18, 2020 (15 pages) (Year: 2020).*
(Continued)

Primary Examiner — Adam Krupicka
(74) Attorney, Agent, or Firm — Cantor Colburn LLP

(57) ABSTRACT

Provided are a hot-dip galvanized steel sheet and a hot-dip galvannealed steel sheet with excellent aging-resistance properties and bake hardenability, and a method for manufacturing the same. The hot-dip galvanized steel sheet has a molten zinc plated layer on the surface of a base steel sheet, wherein the base steel sheet comprises: 0.002-0.012 wt % of carbon (C); 1.6-2.7 wt % of manganese (Mn); 0.03 wt % or less (excluding 0 wt %) of phosphorus (P); 0.01 wt % or less (excluding 0 wt %) of sulfur (S); 0.01 wt % or less (excluding 0 wt %) of nitrogen (N); 0.02-0.06 wt % of aluminum (sol.Al); 1.0 wt % or less (excluding 0 wt %) of chromium (Cr), with the remainder being iron and inevitable impurities; the base steel sheet satisfies the relation of 1.3≤Mn(wt %)/(1.15×Cr(wt %))≤20.5; Mneq defined by relational expression 1 satisfies 1.9≤Mneq≤3.9.

6 Claims, 2 Drawing Sheets

(51) Int. Cl.
   *C21D 9/46*   (2006.01)
   *B32B 15/01*  (2006.01)
   *C21D 8/02*   (2006.01)
   *C23C 2/28*   (2006.01)
   *C22C 38/06*  (2006.01)
   *C22C 38/22*  (2006.01)
   *C22C 38/32*  (2006.01)
   *C22C 38/38*  (2006.01)
   *C22C 38/18*  (2006.01)
   *C23C 2/02*   (2006.01)
   *C22C 38/00*  (2006.01)
   *C21D 6/00*   (2006.01)
   *C23C 2/40*   (2006.01)

(52) U.S. Cl.
   CPC ......... *C21D 8/0205* (2013.01); *C21D 8/0263* (2013.01); *C22C 38/001* (2013.01); *C22C 38/002* (2013.01); *C22C 38/004* (2013.01); *C22C 38/04* (2013.01); *C22C 38/06* (2013.01); *C22C 38/18* (2013.01); *C22C 38/22* (2013.01); *C22C 38/32* (2013.01); *C22C 38/38* (2013.01); *C23C 2/02* (2013.01); *C23C 2/06* (2013.01); *C23C 2/28* (2013.01); *C23C 2/40* (2013.01); *C21D 8/0226* (2013.01); *C21D 8/0236* (2013.01); *C21D 2211/005* (2013.01); *C21D 2211/008* (2013.01)

(56) References Cited

U.S. PATENT DOCUMENTS

| | | |
|---|---|---|
| 2003/0099857 A1 | 5/2003 | Nomura et al. |
| 2004/0261919 A1 | 12/2004 | Nakajima et al. |
| 2009/0139611 A1 | 6/2009 | Kimura et al. |
| 2010/0132850 A1 | 6/2010 | Ono et al. |
| 2010/0326572 A1 | 12/2010 | Ono et al. |
| 2010/0330392 A1 | 12/2010 | Ono et al. |
| 2012/0118439 A1 | 5/2012 | Ono et al. |
| 2012/0180909 A1 | 7/2012 | Ono et al. |
| 2013/0266821 A1 | 10/2013 | Kawasaki et al. |

FOREIGN PATENT DOCUMENTS

| | | |
|---|---|---|
| EP | 0620288 | 10/1994 |
| EP | 1666622 | 6/2006 |
| EP | 2184374 | 5/2010 |
| EP | 2881483 | 6/2015 |
| JP | 2004197156 | 7/2004 |
| JP | 2007146275 | 6/2007 |
| JP | 2007211338 | 8/2007 |
| JP | 2008274397 | 11/2008 |
| JP | 2009030147 | 2/2009 |
| JP | 2009030148 | 2/2009 |
| JP | 2009035814 | 2/2009 |
| JP | 2009035818 | 2/2009 |
| JP | 2009263713 | 11/2009 |
| JP | 2013064172 | 4/2013 |
| JP | 2013185240 | 9/2013 |
| KR | 20100023025 | 3/2010 |
| KR | 20100027209 | 3/2010 |
| KR | 20110046689 | 5/2011 |
| KR | 20120025591 | 3/2012 |
| KR | 20120035947 | 4/2012 |
| KR | 20130025961 | 3/2013 |
| KR | 20150050001 | 5/2015 |
| WO | 2004001084 | 12/2003 |

OTHER PUBLICATIONS

Chinese Office Action—Chinese Application No. 201680043417.3 dated Dec. 29, 2018.
Japanese Office Action—Japanese Application No. 2018-503140 dated Mar. 5, 2019.
European Search Report—European Application No. 16830692.6, dated Mar. 26, 2018.
International Search Report—PCT/KR2016/006398 dated Sep. 12, 2015.

* cited by examiner

HOT-DIP GALVANIZED STEEL SHEET AND HOT-DIP GALVANNEALED STEEL SHEET WITH EXCELLENT AGING RESISTANCE PROPERTIES AND BAKE HARDENABILITY, AND METHOD FOR MANUFACTURING SAME

TECHNICAL FIELD

The present disclosure relates to materials for automotive body panels, and more particularly, to a cold-rolled steel sheet, a hot-dip galvanized steel sheet, and a hot-dip galvannealed steel sheet that may be used for automotive body panels or the like, because surface defects caused by aging may not occur, even during long distance transportation thereof, due to having excellent aging-resistance properties and bake hardenability, and a manufacturing method thereof.

BACKGROUND ART

Materials for automotive body panels require steel sheets having a high degree of yield strength to protect the surfaces thereof from external impacts. Steel sheets having yield strength as high as possible may be used to prevent defects from occurring in body panels during driving, thus contributing to increasing dent resistance and lightness thereof.

Conventionally, bake hardenability (BH)-type steel sheets having a tensile strength of 340 MPa have mainly been applied to automotive body panels, such as doors, trunk lids, and fenders, requiring excellent dent resistance. In recent years, as the importance of yield strength has risen, due to dent resistance evaluation, steel sheets have been designed to have a yield strength of 180 MPa or higher, for use in body panels. Accordingly, high-strength BH-type steel sheets having a yield strength of 210 MPa, 240 MPa, or 260 Mpa have been developed to contribute to lightness thereof with a reduction in thickness thereof resulting from an increase in yield strength thereof, and mass production of such steel sheets is being promoted.

Most of these types of steel have bake hardenability through using ultra-low carbon steel as a base and effectively controlling an amount of Ti or Nb to be small. However, bake hardenability (hereinafter referred to as "BH properties") of the steel may vary due to variations in the content range of C during a steelmaking operation. When the BH properties of the steel partially increase, aging-resistance properties (hereinafter "AI" properties) thereof may be degraded, so that surface defects may occur during component processing due to aging resulting from long distance transportation.

That is, when BH properties increase, aging-resistance properties may be deteriorated. Aging-resistance properties may be degraded due to aging resulting from long distance transportation of steel sheets, and from long-term storage thereof in warehouses before component processing, which may cause surface defects, in which the surfaces of body panels may be wrinkled after the steel sheet is pressed. Thus, the steel sheet may have many problems as a BH-type steel sheet. Thus, there may be a need for the development of a technology capable of manufacturing a complex phase (ferrite and martensite) BH-type steel sheet in which an aging problem rarely occurs because it has improved aging-resistance properties, as well as BH properties.

Such a complex phase BH-type steel sheet has excellent BH properties due to a movable potential around a martensite (M) phase formed within the microstructure thereof, while having aging-resistance properties. However, to manufacture such a complex phase BH-type steel sheet, it may be essential to add fundamental hardenability elements, such as C, Mn, Cr, and the like, in a proper amount or more. Thus, it may be somewhat difficult to manufacture a complex phase steel having a low degree of yield strength.

Meanwhile, steel sheets for automobiles should have a high degree of corrosion resistance. Thus, hot-dip galvanized steel sheets having a high degree of corrosion resistance have long been used as steel sheets for automobiles. Since hot-dip galvanized steel sheets are produced using continuous hot-dip galvanizing equipment in which a recrystallization annealing process and a galvanizing process are performed on the same production line, hot-dip galvanized steel sheets having a high degree of corrosion resistance may be manufactured at low cost. In addition, hot-dip galvannealed steel sheets obtained by heating hot-dip galvanized steel sheets have a high degree of weldability or formability with a high degree of corrosion resistance, and thus they are widely used.

As such a complex phase BH-type steel sheet, Patent Document 1 (Korean Patent Publication No. 2010-0023025) discloses a BH steel having excellent BH properties manufactured by having 0.01-0.12 wt % of C, less than 2 wt % of Mn, controlling an area ratio of a second phase average particle diameter, and controlling a heating rate to 3° C./s or less during annealing. However, economical effects may be insufficient during actual mass production of the BH steel due to an excessively low heating rate during annealing. In particular, since the content of C is about 0.02 wt %, the yield strength thereof may be 230 MPa or higher. Therefore, surface defects may be highly likely to occur during component processing.

Patent Document 2 (Korean Patent Publication No. 2012-0025591) discloses a complex phase BH-type steel sheet manufactured by controlling the content of P, contained in a steel sheet having greater than 0.015 wt % of C, to 0.015-0.05 wt %. However, the tensile strength thereof is higher than or equal to 440 MPa and the yield strength thereof is about 220 MPa, so that it may be difficult to replace a conventional 340 BH steel sheet with the above complex phase BH-type steel sheet. The hole expansion ability thereof may be increased by partially incorporating a bainite (B) phase thereinto. However, this may also highly increase the likelihood of surface defects, due to a high degree of yield strength during component processing.

Patent Document 3 (Japanese Patent Publication No. 2009-035818) discloses a steel, which may cause surface defects, due to an increase in yield strength, relative to tensile strength, resulting from the inclusion of bainite into a portion of the microstructure of the steel. Since the content of Cr in the steel exceeds 0.5 wt %, a Cr-based oxide may be formed on the surface of the steel sheet, so that it may be difficult to remove scale during hot rolling. Thus, the steel sheet may have a large number of surface defects as body panels. As a result, the steel sheet may be disadvantageous in manufacturing steel for body panels having a beautiful surface.

DISCLOSURE

Technical Problem

An aspect of the present disclosure may provide a hot-dip galvanized or galvannealed steel sheet so as to address the above-described limitations of the related art, the hot-dip galvanized or galvannealed steel sheet having an optimized composition and being produced under optimized manufacturing conditions to improve bake hardenability and aging-resistance properties and adjust yield strength to be within the range of 170 MPa or higher for use of the steel sheet in the manufacturing of automotive body panels.

An aspect of the present disclosure may also provide a method for manufacturing the hot-dip galvanized or galvannealed steel sheet.

However, aspects of the present disclosure are not limited thereto. Additional aspects will be set forth in part in the description which follows, and will be apparent from the description to those of ordinary skill in the related art.

Technical Solution

According to an aspect of the present disclosure, a hot-dip galvanized steel sheet having excellent aging-resistance properties and bake hardenability may be provided. The hot-dip galvanized steel sheet may have a galvanized layer on the surface of a base steel sheet.

The base steel sheet may include: by wt %, 0.002-0.012% of carbon (C); 1.6-2.7% of manganese (Mn), 0.03% or less (excluding 0%) of phosphorus (P), 0.01% or less (excluding 0%) of sulfur (S), 0.01% or less (excluding 0%) of nitrogen (N); 0.02-0.06% of aluminum (sol.Al); 1.0% or less (excluding 0%) of chromium (Cr), with a remainder of iron and inevitable impurities. The base steel sheet may satisfy the relationship $1.3 \leq Mn(wt\%)/(1.15 \times Cr(wt\%)) \leq 20.5$. Mneq, defined by the following Relational Expression 1, may satisfy $1.9 \leq Mneq \leq 3.9$.

The microstructure of the steel may include an area ratio of 95% or more of ferrite, with a remainder of a hard second phase.

An occupation ratio of martensite present in a ferrite grain boundary, defined by the following Relational Expression 2, may be 90% or more.

A difference between an average Mn concentration wt % (a) in a martensite phase at a ¼t point of the base steel sheet and an average Mn concentration wt % (b) in a ferrite phase within 1 μm of the martensite phase, defined by the following Relational Expression 3, may be 0.3 wt % or more, $$Mneq = Mn + 2P + 1.15Cr \quad \text{[Relational Expression 1]}$$

$$P(\%) = \{Pgb/(Pg+Pgb)\} \times 100, \quad \text{[Relational Expression 2]}$$

where P is an occupation ratio of martensite present in a ferrite grain boundary, Pgb is an occupation area of martensite present in the ferrite grain boundary, and Pg is an occupation area of martensite present in ferrite crystal grains, $$a - b \geq 0.3 \text{ wt \%}, \quad \text{[Relational Expression 3]}$$

where a is the average Mn concentration wt % (a) in the martensite phase at the ¼t point of the base steel sheet, and b is the average Mn concentration wt % (b) in the ferrite phase within 1 μm of the martensite phase.

The base steel sheet may further include at least one of 0.003% or less (excluding 0%) of boron (B) and 0.2% or less (excluding 0%) of molybdenum (Mo).

An area % of fine martensite having an average diameter of 1 μm or less in the martensite phase forming the second phase may preferably be 2% or less (excluding 0%).

Before a skin pass rolling process, the base steel sheet may have a yield strength of 210 MPa or lower and a yield ratio of 0.55 or less.

According to an aspect of the present disclosure, a hot-dip galvannealed steel sheet having excellent aging-resistance properties and bake hardenability, manufactured by subjecting the galvanized layer of the hot-dip galvanized steel sheet to an alloying treatment, may be provided.

According to an aspect of the present disclosure, a method for manufacturing a hot-dip galvanized steel sheet having excellent aging-resistance properties and bake hardenability may include: preparing a steel slab, the steel slab comprising: 0.002-0.012% of carbon (C); 1.6-2.7% of manganese (Mn), 0.03% or less (excluding 0%) of phosphorus (P); 0.01% or less (excluding 0%) of sulfur (S); 0.01% or less (excluding 0%) of nitrogen (N); 0.02-0.06% of aluminum (sol.Al); 1.0% or less (excluding 0%) of chromium (Cr), with a remainder of iron and inevitable impurities, wherein the steel slab satisfies the relationship $1.3 \leq Mn(wt\%)/(1.15 \times Cr(wt\%)) \leq 20.5$ and Mneq, defined by the following Relational Expression 1, satisfies $1.9 \leq Mneq \leq 3.9$, and reheating the steel slab; finish hot rolling the reheated steel slab within a temperature range of (Ar3+20° C. to 950° C.) and then coiling the hot-rolled steel slab within a temperature range of 450° C. to 700° C.; cold rolling the coiled hot-rolled steel sheet at a reduction ratio of 40% to 80% and then continuously annealing the cold rolled steel sheet within a temperature range of 760° C. to 850° C.; primarily cooling the continuously annealed steel sheet to a temperature within a range of 630° C. to 670° C. at an average cooling rate of 3° C./s or higher, immersing the primarily cooled steel sheet in a galvanizing pot to galvanize the primarily cooled steel sheet, and then secondarily cooling the galvanized steel sheet to a temperature of (Ms—200° C.) or lower at an average cooling rate of 4° C./s or higher.

The steel slab may further include at least one of 0.003% or less (excluding 0%) of boron (B) and 0.2% or less (excluding 0%) of molybdenum (Mo).

In addition, a base steel sheet may form the galvanized steel sheet manufactured by the secondary cooling.

The microstructure of the steel may include, by area %, ferrite of 95% or more and a remainder of a hard second phase.

An occupation ratio of martensite present in a ferrite grain boundary, defined by the following Relational Expression 2, may be 90% or more.

A difference between an average Mn concentration wt % (a) in a martensite phase at a ¼t point of the base steel sheet and an average Mn concentration wt % (b) in a ferrite phase within 1 μm of the martensite phase, defined by the following Relational Expression 3, may be 0.3 wt % or more.

An area % of fine martensite having an average diameter of 1 μm or less in the martensite phase forming the second phase may be 2% or less (excluding 0%).

According to an aspect of the present disclosure, a method for manufacturing a hot-dip galvannealed steel sheet having excellent aging-resistance properties and bake hardenability may include immersing the steel sheet in a galvanizing pot after the primary cooling to be galvanized, may subject the galvanized steel sheet to an alloying treatment within a temperature range of 460° C. to 610° C., and may then secondarily cool the alloyed steel sheet to a temperature of (Ms—200° C.) or lower at an average cooling rate of 4° C./s or higher.

Advantageous Effects

According to the exemplary embodiments in the present disclosure, a hot-dip galvanized or galvannealed steel sheet having both excellent aging-resistance properties and bake hardenability may be provided, and thus the steel sheet may be suited for use in automotive body panels in which an aging defect does not occur during long distance transportation thereof.

BEST MODE FOR INVENTION

Figure 1:
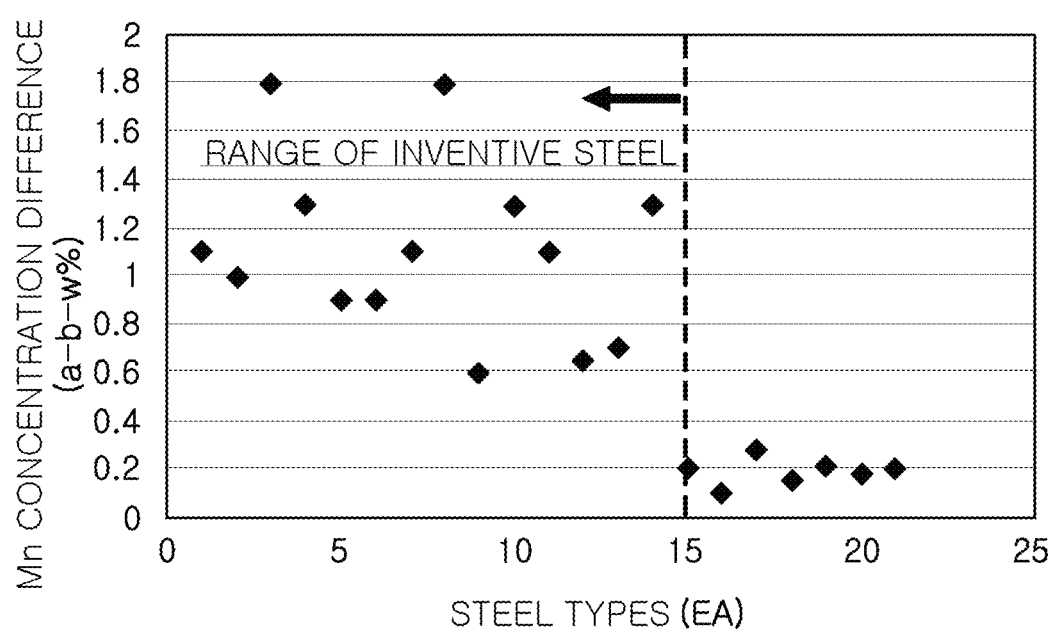
FIG. 1 is a graph illustrating a difference between an average Mn concentration wt % (a) in a martensite (M) phase at a ¼t point of a base steel sheet and an average Mn concentration wt % (b) in a ferrite phase within 1 μm of the martensite (M) phase, according to an exemplary embodiment in the present disclosure.

The inventors have conducted significant research into developing steel sheets having excellent formability by ensuring both aging-resistance properties and bake hardenability, in order to provide steel sheets suitable for use in automotive body panels. As a result, the inventors have found that complex phase steel sheets having desired properties could be obtained by optimizing alloying element contents and manufacturing conditions, and based on this knowledge, the inventors have invented the present invention.

Hereinafter, exemplary embodiments in the present disclosure will be described in detail.

First, a hot-dip galvanized or galvannealed steel sheet having aging-resistance properties and bake hardenability, according to an exemplary embodiment in the present disclosure, will be described.

A cold-rolled steel sheet (a base steel sheet), or a base steel sheet forming a hot-dip galvanized or galvannealed steel sheet, according to an exemplary embodiment in the present disclosure, may include: by wt %, 0.002-0.012% of carbon (C); 1.6-2.7% of manganese (Mn), 0.03% or less (excluding 0%) of phosphorus (P), 0.01% or less (excluding 0%) of sulfur (S); 0.01% or less (excluding 0%) of nitrogen (N); 0.02-0.06% of aluminum (sol.Al); 1.0% or less (excluding 0%) of chromium (Cr), with a remainder of iron (Fe) and inevitable impurities. The alloying elements and the reasons for limiting the compositions thereof will be described below in detail.

Here, the content of each element is given in wt % unless otherwise specified.

Carbon (C): 0.002% to 0.012%

Carbon (C) may be an element important in manufacturing a steel sheet having a complex phase through guaranteeing a second phase in an exemplary embodiment in the present disclosure. C may form martensite in a steel sheet as one of dual phases, thus guaranteeing the strength of the steel sheet. In general, as the content of C increases, it may be easy to form martensite, which may be advantageous in manufacturing a complex phase steel. However, it may be important to control the content of C to produce an optimal complex phase steel. When the content of C is excessively low, a sufficient area ratio of the second phase may not be ensured. Thus, it may be impossible to manufacture a bake hardenability-type steel sheet having excellent aging-resistance properties, using a complex phase steel. In contrast, when the content of C is excessively high, the excessively high content of C may be advantageous in forming a complex phase steel. However, the yield strength thereof may increase, so that a complex phase steel having a yield strength of 210 MPa or lower may not be obtained before a skin pass rolling process, while a surface curvature defect may be highly likely to occur during the processing of a client's components.

The purpose of the present disclosure is to manufacture a bake hardenability-type complex phase steel having excellent aging-resistance properties with a low content of C by optimizing the content of C as much as possible. When the content of C is less than 0.002%, a complex phase steel may not be obtained. When the content of C exceeds 0.012%, a complex phase steel may be obtained, but the yield strength thereof may increase, so that a bake-hardened steel having excellent surface qualities may not generally be produced. Thus, in an exemplary embodiment in the present disclosure, it may be preferable to limit the content of C to a range of 0.002% to 0.012%, more preferably 0.004% to 0.01%.

Manganese (Mn): 1.6% to 2.7%

Manganese (Mn) may be an element improving the hardenability of a steel sheet having a complex phase. Particularly, Mn may be an element important in forming martensite. Mn may be effective in increasing the strength of a conventional solid solution-strengthened steel with the effect of solid-solution strengthening. In addition, Mn may cause sulfur (S), inevitably added to steel, to precipitate out into MnS, thus preventing fractures and high-temperature embrittlement caused by S during a hot rolling process.

In an exemplary embodiment in the present disclosure, it may be preferable to add 1.6% or more of Mn. When the content of Mn is less than 1.6%, martensite may not be formed. Thus, yield point extension properties may be exhibited during a tension process of a complex phase steel and the yield ratio thereof may increase, while it may be difficult to produce the complex phase steel. On the other hand, when the content of Mn exceeds 2.7%, martensite may be formed excessively, the quality of steel may not be satisfactory, and a Mn-Band, for example, a band of a Mn oxide, may be formed in the microstructure thereof to increase the risk of an occurrence of cracking and fractures. In addition, a Mn oxide may be eluted on the surface of steel during an annealing process, and thus the platability of the steel may be significantly lowered.

Thus, in an exemplary embodiment in the present disclosure, it may be preferable to limit the content of Mn to 1.6% to 2.7%, more preferably 2.0% to 2.4%.

Chromium (Cr): 1.0% or Less (Excluding 0%)

Chromium (Cr) may be an element having characteristics similar to the above-described characteristics of Mn. Cr may be added to steel to increase the hardenability and strength of the steel. Cr may be effective in forming martensite. Cr may form a coarse Cr-based carbide, such as $Cr_{23}C_6$, during a hot rolling process, thus causing C dissolved in the steel to precipitate in a proper amount or less. Thus, Cr may suppress yield point elongation (YP-El) and may be advantageous in manufacturing a complex phase steel having a low yield ratio. In addition, Cr may significantly reduce a decrease in the elongation of steel when increasing the strength of the steel, thus being advantageous in manufacturing a complex phase steel having a high degree of ductility.

In an exemplary embodiment in the present disclosure, Cr may facilitate the formation of martensite in the steel sheet by improving the hardenability of the steel sheet. However, when the content of Cr exceeds 1.0%, an excessive amount of martensite formed may cause the strength and elongation of the steel sheet to decrease. Thus, in an exemplary embodiment in the present disclosure, it may be preferable to limit the content of Cr to 1.0% or less (excluding 0%, by taking the amount of Cr inevitably added in a manufacturing process into account).

Phosphorus (P): 0.03% or Less (Excluding 0%)

In steel, phosphorus (P) may be the most effective element in guaranteeing strength without significantly decreasing formability. However, when an excessive amount of P is added to the steel, the possibility of causing brittle fractures may increase significantly, and thus steel slabs may fracture during a hot rolling process. In addition, an excessive amount of P may degrade plating surface qualities.

Therefore, in an exemplary embodiment in the present disclosure, the content of P may be limited to a maximum of 0.03% (excluding 0%, by taking the amount of P inevitably added into account).

Sulfur (S): 0.01% or Less (Excluding 0%)

Sulfur (S) may be an impurity inevitably added to steel, and it may be important to control the content of S to be as low as possible. Particularly, S in the steel may increase the possibility of the occurrence of red brittleness, and thus it may be preferable that the content of S be controlled to be 0.01% or less (excluding 0%, by taking the amount of S inevitably added in a manufacturing process into account).

Nitrogen (N): 0.01% or Less (Excluding 0%)

Nitrogen (N) may be an impurity inevitably added to steel. Although it is important to control the content of N to be as low as possible, this may sharply increase refining costs of the steel. Thus, it may be preferable to control the content of N to be within a range of 0.01% or less in consideration of manufacturing conditions (excluding 0%, by taking into account the amount of N inevitably added into account).

Acid-Soluble Aluminum (Sol.Al): 0.02% to 0.06%

Acid-soluble aluminum (sol.Al) may be an element added to steel to significantly reduce a particle size of the steel and deoxidize the steel, and when the content of sol.Al is less than 0.02%, an Al killed steel may not be produced in a normal stable state. On the other hand, when the content of sol.Al exceeds 0.06%, the excess of sol.Al may be advantageous in increasing the strength of steel due to a grain refinement effect. However, due to excessive formation of inclusions during a continuous-casting steelmaking operation, manufacturing costs may be increased, in addition to the possibility of surface defects in a hot-dip galvanized steel sheet being increased. Thus, in an exemplary embodiment in the present disclosure, it may be preferable to control the content of sol.Al to be 0.02% to 0.06%.

In an exemplary embodiment in the present disclosure, at least one of boron (B) and molybdenum (Mo) as other optional elements may be included in steel, and may slightly increase the hardenability of the steel to help to manufacture a complex phase steel.

Boron (B): 0.003% or Less (Excluding 0%)

Boron (B) may be an element added to steel to prevent secondary working embrittlement caused by the addition of P. When the content of B exceeds 0.003%, the elongation of the steel may be lowered, and thus the content of B may be controlled to be 0.003% or less (excluding 0%, by taking the amount of B inevitably added into account).

Molybdenum (Mo): 0.2% or Less (Excluding 0%)

Molybdenum (Mo) may be an element increasing the hardenability of a steel sheet having a complex phase. Particularly, Mo may be an element important in forming martensite. In an exemplary embodiment in the present disclosure, it may be preferable to add Mo in an amount of 0.2% or less, more preferably 0.1% or less. When the content of Mo exceeds 0.2%, the hardenability of the steel sheet may be increased to help to form a martensite (M) phase. However, since the content of M itself increases, production costs may be increased at the time of alloy design, while the yield strength of the steel sheet may be increased.

In an exemplary embodiment in the present disclosure, Mo and B may be added simultaneously, or Mo may be added alone. Here, since uniform crystal grains may be formed during an annealing process, the formation of uniform crystal grains may be advantageous in terms of formability. Thus, in an exemplary embodiment in the present disclosure, it may be preferable to limit the content of Mo to be 0.02% or less.

The base steel sheet, according to an exemplary embodiment in the present disclosure, may include a remainder of Fe and other inevitable impurities, in addition to the above-described elements.

In addition, the base steel sheet forming the hot-dip galvanized steel sheet or the like, according to an exemplary embodiment in the present disclosure, may preferably maintain the relationship $1.3 \leq Mn(wt\%)/(1.15 \times Cr(wt\%)) \leq 20.5$ as the relationship of Mn and Cr which are curing elements. When the content of Cr increases as compared to that of Mn, even though the behavior of both elements is similar in terms of hardenability, when an excessive amount of Cr, a corrosion resistance increasing element, is added, a problem may occur in removing pickled to scale after a hot rolling process. In particular, the base steel sheet may not be used as steel for body panels.

Thus, the base steel sheet, according to an exemplary embodiment in the present disclosure, may preferably satisfy the relationship $1.3 \leq Mn(wt\%)/(1.15 \times Cr(wt\%)) \leq 20.5$. When the Relational Expression of $Mn(wt\%)/(1.15 \times Cr(wt\%))$ exceeds a value of 20.5, the surface quality of a body panel may not be ensured. When the value is less than 1.3, the content of Mn may relatively increase, so that a Mn band may be formed in the microstructure, thus resulting in a processing defect in addition to a surface defect.

In addition, Mn, Cr, and the like, which are hardenability increasing elements, should be added in proper amounts or more to manufacture a complex phase steel, using an ultra-low carbon steel having the content of C of 0.012% or less required in an exemplary embodiment in the present disclosure. In an exemplary embodiment in the present disclosure, it may be preferable to control the composition, such that a Mneq value indicating hardenability for forming the martensite (M) phase, defined by the following [Relational Expression 1], may satisfy $1.9 \leq Mneq \leq 3.9$.

When the Mneq value is less than 1.9, even though rapid cooling is performed after an annealing process, no martensite (M) phase may be formed at all due to a low content of C, which may not meet a condition according to an exemplary embodiment in the present disclosure. When the Mneq value exceeds 3.9, a complex phase steel may be produced. However, the addition of a large amount of alloying elements may involve an increase in the yield strength and tensile strength thereof and may cause a deterioration in the elongation thereof. Considering this, it may be preferable to control the Mneq value to be within a range of 1.9 to 3.9 in an exemplary embodiment in the present disclosure, more preferably 2.1 to 3.5.

$$Mneq = Mn + 2P + 1.15Cr \qquad \text{[Relational Expression 1]}$$

The hot-dip galvanized or galvannealed steel sheet, according to an exemplary embodiment of the present disclosure, satisfying the above-described composition may preferably include ferrite as a main phase and martensite as the remainder, as the microstructure of the base steel sheet thereof. Here, bainite may also be partially included. The amount of bainite may preferably be controlled to be as low as possible (if possible, to be zero).

Thus, in the base steel sheet forming the hot-dip galvanized steel sheet, according to an exemplary embodiment in the present disclosure, the microstructure thereof may preferably be composed of, by area %, ferrite of 95% or more and a remainder of a hard second phase, based on a total thickness (t) of the microstructure. In an exemplary embodiment in the present disclosure, when the ferrite fraction is less than 95%, the fraction of the second phase may relatively increase, which may be advantageous in producing a complex phase steel. However, when the fraction of the ferrite decreases, the yield strength and the yield ratio may increase, which may also cause a surface curvature defect to be highly likely to occur during processing components. Thus, it may be preferable to control the fraction of the ferrite to be 95% or more.

Here, in an exemplary embodiment in the present disclosure, it may be preferable to control the fraction of fine martensite, having an average diameter of 1 µm or less, in the hard second phase to be, by area %, 2% or less (excluding 0%). As an excessively fine martensite (M) phase is widely distributed, excellent bake hardenability may be exhibited by an interaction between a movable potential, formed in the periphery of the martensite phase, and solid solution C. However, when the fraction of fine martensite, having an average diameter of 1 µm or less, in the second phase, exceeds, by area %, 2%, the yield ratio may increase and the yield strength may also increase, so that a surface defect may be highly likely to occur during processing components. Thus, it may be preferable to control the fraction of the martensite phase to be, by area %, 2% or less.

In addition, in an exemplary embodiment in the present disclosure, an occupation ratio of martensite present in a ferrite grain boundary, defined by the following [Relational Expression 2], may preferably be, by area %, 90% or more, $$P(\%)=\{Pgb/(Pg+Pgb)\}\times 100,\qquad\text{[Relational Expression 2]}$$

where P is an occupation ratio of martensite present in the ferrite grain boundary, Pgb is an occupation area of martensite present in the ferrite grain boundary, and Pg is an occupation area of martensite present in ferrite crystal grains.

When P(%) is less than 90% in [Relational Expression 2], a large amount of a martensite (M) phase may be formed within crystal grains of ferrite (F), so that a bake-hardened steel having excellent aging-resistance properties may not be manufactured. More preferably, P(%) may be 92% or more. In other words, this shows that in producing a bake-hardened steel having excellent aging-resistance properties, it may be advantageous that a large amount of a fine martensite phase be present in the crystal grains of ferrite.

That is, a large amount of a movable potential may be formed in the ferrite (F) phase around the martensite (M) phase formed in the crystal grains, and bake hardenability may be exhibited by an interaction between the movable potential and solid solution C. At a normal baking temperature of 170° C. (for 20 minutes), activity of C concentrated on martensite may be high. When steel is heated, C may diffuse into the ferrite phase, so as to interact with (hereinafter referred to as "locking") an electrical potential, thus exhibiting excellent bake hardenability. On the other hand, in a condition of artificial aging (100° C., 1 hr), activity of C concentrated on martensite may be low, so that C may remain on the martensite (M) phase as is without diffusing into the ferrite (F) phase, thus not being locked with the electrical potential around the martensite phase. As a result, aging does not matter. In this aspect, as a large amount of a martensite (M) phase is present in the crystal grains within the microstructure, a large quantity of a movable potential may be formed around the ferrite (F) phase, and it may be possible to manufacture a bake-hardened steel having excellent aging-resistance properties.

Meanwhile, it may be preferable that a difference between an average Mn concentration wt % (a) in the martensite (M) phase at a ¼t point of the base steel sheet and an average Mn concentration wt % (b) in the ferrite phase within 1 µm of the martensite (M) phase, defined by the following [Relational Expression 3], be controlled to be 0.3 wt % or more, $$a-b\geq 0.3\text{ wt \%},\qquad\text{[Relational Expression 3]}$$

where a is the average Mn concentration wt % (a) in the martensite phase at the ¼t point of the base steel sheet, and b is the average Mn concentration wt % (b) in the ferrite phase within 1 µm of the martensite phase.

The higher the strength of the second phase, that is, a degree of the hardness of the martensite (M) phase, is, the more consistent with a condition according to an exemplary embodiment in the present disclosure is. In order to increase the strength of the martensite phase itself, the content of Mn included in the martensite phase may be required to be higher than that of the ferrite phase therearound. This shows that as the strength of the martensite phase increases, it may be possible to relatively soften the ferrite phase therearound, so as to allow a steel sheet having a low yield strength and a low yield ratio and a bake-hardened steel having excellent aging-resistance properties to be manufactured.

That is, as the strength of the martensite phase increases, the concentration (density) of solid solution C within the martensite phase may be high, so that C within the martensite phase may easily diffuse into the ferrite phase at a proper level of baking temperature, thus increasing bake hardenability.

In this aspect, it may be advantageous in increasing bake hardenability that the difference between the Mn concentrations wt % in the martensite phase and the ferrite phase within 1 µm of the martensite phase is higher. When the Mn concentration difference is less than 0.3 wt %, C may not easily diffuse into the ferrite phase during a baking process, so that bake hardenability may be degraded. Thus, it may be preferable to control the Mn concentration difference to be 0.3 wt % or more.

Meanwhile, the Mn concentration analysis of each phase (the martensite (M) phase or the ferrite (F) phase) may be performed by measuring Mn concentrations at 10 points in each phase, using a transmission electron microscope (TEM) and an energy-dispersive X-ray spectroscopy (EDS) analysis technique, and measuring an average of the Mn concentrations.

An exemplary embodiment in the present disclosure having the above-mentioned steel composition and microstructure may provide a cold-rolled steel sheet, a hot-dip galvanized steel sheet, and a hot-dip galvannealed steel sheet having a low yield strength and a low yield ratio, such as a yield strength of 210 MPa or lower and a yield ratio (YS/TS) of 0.55 or less before a skin pass rolling process.

In addition, the exemplary embodiment may provide a bake-hardened steel having excellent aging-resistance properties, which may fundamentally ensure bake hardenability (BH) properties of 40 MPa or higher and may exhibit no yield point elongation (YP-El) at all in a tensile test after an artificial aging process (100° C., 1 hr), such that 6-month aging resistance at room temperature may be guaranteed.

Next, a method for manufacturing a complex phase-type hot-dip galvanized or galvannealed steel sheet having excellent aging-resistance properties and BH properties, according to an exemplary embodiment in the present disclosure, will be described in detail. Also, a cold-rolled steel sheet (a base steel sheet) that has not been galvanized may be included in the scope of the present disclosure.

First, in an exemplary embodiment in the present disclosure, a steel slab having the above-described steel composition may be prepared and then reheated. The reheating process may be performed to allow a subsequent hot rolling process to be smoothly performed and to allow intended physical properties of a steel sheet to be sufficiently obtained. In an exemplary embodiment in the present disclosure, conditions for the reheating process are not particularly limited. Normal conditions for reheating processes may be used. For example, the reheating process may be performed within a temperature range of 1,100° C. to 1,300° C.

Subsequently, in an exemplary embodiment in the present disclosure, a process of finish hot rolling the reheated steel slab within a temperature range of (Ar3+20° C. to 950° C.) and then coiling the hot-rolled steel slab at 450° C. to 700° C. may be included.

Here, in an exemplary embodiment in the present disclosure, it may be preferable to finish hot roll the reheated steel slab within the temperature range of (Ar3+20° C. to 950° C.) where Ar3 is defined by the following Relational Expression 4. The finish hot rolling process may be fundamentally advantageously performed on the reheated steel slab within an austenitic single phase region. This is because when the finish hot rolling process is performed within the austenitic single phase region, the microstructure of the steel slab basically composed of single-phase crystal grains may be uniformly deformed, and thus the uniformity of the microstructure of the steel slab may be increased. When the finish hot rolling temperature is lower than Ar3+20° C., the steel slab may be highly likely to be hot-rolled to have a dual phase microstructure of ferrite and austenite, resulting in the nonuniformity of material quality of the steel slab. On the other hand, when the finish hot rolling temperature exceeds 950° C., abnormally coarse grains may be formed by a high-temperature hot rolling process, and thus when the hot-rolled steel slab is cooled and coiled, the hot-rolled steel sheet may be twisted due to the nonuniformity of material quality of the steel slab.

Ar3=910-310*C-80*Mn-20*Cu-15*Cr-55*Ni-80*Mo,   [Relational Expression 4]

where Ar3 is a temperature of the theoretical equation.

In an exemplary embodiment in the present disclosure, after the finish hot rolling process, the hot-rolled steel sheet may be coiled at 450° C. to 700° C. If the coiling temperature is lower than 450° C., an excessive amount of martensite or bainite may be formed in the hot-rolled steel sheet, resulting in an excessive increase in the strength of the hot-rolled steel sheet. Thus, a problem of a shape defect or the like due to a rolling load may occur during a subsequent cold rolling process. On the other hand, when the coiling temperature exceeds 700° C., elements in steel, such as Mn, B, and the like, which may degrade the wettability of the hot-rolled steel sheet may be excessively concentrated on the surface of the hot-rolled steel sheet. Thus, it may be preferable to control the coiling temperature to be 450° C. to 700° C. Subsequently, the coiled hot-rolled steel sheet may be subjected to a pickling process in normal conditions.

Next, in an exemplary embodiment in the present disclosure, the coiled hot-rolled steel sheet may be cold rolled at a reduction ratio of 40% to 80%. The cold rolling process may preferably be performed at the reduction ratio of 40% to 80%. When the reduction ratio is lower than 40%, it may be difficult to obtain an intended steel sheet thickness and to correct the shape of the steel sheet. On the other hand, when the reduction ratio exceeds 80%, cracking may be highly likely to occur in an edge portion of the steel sheet, and a load may be applied to the cold rolling process.

Subsequently, in an exemplary embodiment in the present disclosure, a continuous annealing process may be performed within a temperature range of 760° C. to 850° C. The annealing temperature may be fundamentally within a dual phase annealing temperature range, and contents of martensite ultimately formed according to fractions of ferrite and martensite during a dual phase annealing process may be different. When the annealing temperature is low, the content of austenite may decrease, but the concentration of C within the austenite may be high. Ultimately, a martensite phase having a high strength may be formed, so that the steel sheet may exhibit excellent bake hardenability when baked. In addition, at an excessively high annealing temperature, the shape of the steel sheet may be twisted during an on-site manufacturing process, and a relatively coarse martensite phase may be formed, so that a bake-hardened steel having excellent aging-resistance properties required in an exemplary embodiment in the present disclosure may not be manufactured. When the annealing temperature is an excessively low temperature, lower than 760° C., the tensile strength of the steel sheet may rather increase, so that cracking may be highly likely to occur during processing components, while elongation of the steel sheet may be reduced. On the other hand, when the annealing temperature exceeds 850° C., the high-temperature annealing process may cause a shape defect in the steel sheet, and bake hardenability thereof may not be good. Thus, it may be preferable to limit the continuous annealing temperature to be a range of 760° C. to 850° C., more preferably 770° C. to 810° C.

Even though the present temperature range is within a dual phase (ferrite+austenite) temperature range, it may be preferable to perform the annealing process at a temperature at which ferrite is as abundant as possible. As an initial amount of ferrite increases in the dual phase annealing temperature, crystal grains may be grown more easily after the annealing process, and thus the ductility of the steel sheet may be increased. In addition, an increased concentration of C in austenite may decrease a martensite start (Ms) temperature. Thus, when the steel sheet is ultimately cooled after being subjected to a subsequent hot-dip galvanizing treatment in a galvanizing pot, martensite may be formed in the steel sheet. Accordingly, a large amount of fine martensite may be uniformly distributed in the crystal grains, so that a steel sheet having a high ductility and a low yield ratio may be manufactured.

In an exemplary embodiment in the present disclosure, the continuously annealed steel sheet may be primarily cooled to a temperature within a range of 630° C. to 670° C. at an average cooling rate of 3° C./s or higher. The temperature within a range of 630° C. to 670° C., the primary cooling temperature range, may be a temperature range in which ferrite or pearlite (hereinafter referred to as a "P" phase) may generally be formed. Preferably, the cooling rate may be controlled within the temperature range, such that pearlite may not be formed as much as possible, and the concentration of C may be increased within an austenite phase by allowing a maximum amount of C to diffuse into the austenite phase during the cooling process.

That is, when a pearlite (P) phase is formed before forming the martensite (M) phase during the primary cooling process, the yield strength of the steel sheet may increase and the elongation thereof may decrease. Thus, the formation of the pearlite phase may be suppressed as much as possible. For this purpose, as the cooling rate increases, the formation of the pearlite phase may be advantageously suppressed. However, considering the on-site manufacturing characteristics, the cooling rate may not be unconditionally increased. Thus, an upper limit of the cooling rate may not be restricted. When the cooling rate is lower than 3° C./s, a pearlite phase may be formed, so that the yield ratio of the steel sheet may increase, thus not meeting a condition according to an exemplary embodiment in the present disclosure.

In an exemplary embodiment in the present disclosure, it may be preferable to significantly reduce transformation of austenite into a martensite phase before the galvanizing pot immersion process and to form a fine martensite phase during the ultimate secondary cooling process by increasing the primary cooling rate as much as possible. During the primary cooling process, carbon (C) may have a sufficient time to diffuse into austenite, and this may have a significant effect that C may always be movable in the dual phase region and may generally diffuse into austenite having a high concentration of C, and a diffusion rate thereof may increase in proportion to temperature and time. Thus, the primary cooling temperature may be important. When the primary cooling temperature is an excessively low temperature of lower than 630° C., the diffusion of C to austenite may be insufficient, and thus the concentration of C in ferrite may be high, making it difficult to obtain an intended degree of ductility. On the other hand, when the primary cooling temperature exceeds 670° C., the above-described effects may be easily obtained. However, a subsequent cooling process may be required to be performed at an excessively high cooling rate.

In an exemplary embodiment in the present disclosure, after the primary cooling process, the cold-rolled steel sheet may be immersed in a galvanizing pot to be galvanized, and may then be secondarily cooled to a temperature of (Ms—200° C.) or lower at an average cooling rate of 4° C./s or higher. Accordingly, a hot-dip galvanized steel sheet having excellent aging-resistance properties and bake hardenability may be manufactured. Here, Ms may be defined by the following [Relational Expression 5], Ms(° C.)=539-423C-30.4Mn-12.1Cr-17.7Ni-7.5Mo, [Relational Expression 5]

where Ms is a temperature of the theoretical equation for martensite formation.

According to research results, when a martensite phase is formed in a steel sheet before the steel sheet is treated within a temperature range of 440° C. to 480° C., a normal temperature range of a hot-dip galvanizing pot, the martensite phase may ultimately become coarse, and thus the steel sheet may not have a low yield ratio. Thus, in an exemplary embodiment in the present disclosure, the secondary cooling process may preferably be performed in a condition of a temperature of (Ms—200° C.) or lower. This is because the strength of the martensite (M) phase is low at a temperature of (Ms—200° C.) or higher, so that excellent bake hardenability may not be exhibited. Here, the secondary cooling rate may preferably be controlled to be 4° C./s or higher at which on-site manufacturing conditions may be satisfactory. The higher the secondary cooling rate is, the easier the above-mentioned effects will be obtained. However, considering the on-site manufacturing conditions, it may be preferable to increase the strength of the formed martensite (M) phase as much as possible by maintaining a minimum cooling rate of 4° C./s or higher.

In an exemplary embodiment in the present disclosure, the hot-dip galvanizing treatment may be performed by immersing the steel sheet in a galvanizing pot maintained within a temperature range of 440° C. to 480° C., a normal temperature range. However, the present disclosure is not limited to such detailed hot-dip galvanizing treatment conditions.

In an exemplary embodiment in the present disclosure, after the hot-dip galvanizing treatment, the galvanized steel sheet may be subjected to an alloying treatment for alloying the galvanized steel sheet within a temperature range of 460° C. to 610° C. for 20 seconds or more, to manufacture a hot-dip galvannealed steel sheet. Subsequently, the hot-dip galvannealed steel sheet may be cooled to a temperature of (Ms—200° C.) or lower at an average cooling rate of 4° C./s to manufacture a hot-dip galvannealed steel sheet. In an exemplary embodiment in the present disclosure, the alloying temperature range is not particularly limited, and a normal temperature range for facilitating an alloying treatment was set. However, when the alloying treatment temperature is lower than 460° C., the alloying process may be practically impossible. When the alloying treatment temperature exceeds 610° C., a degree of alloying may be excessively high, thus causing a surface defect during processing. In addition, an alloying treatment retention time may preferably be controlled to be 20 seconds or more, and an upper limit thereof is not particularly limited with consideration of the degree of alloying and productivity. Other conditions may be equal to those used to form the above-mentioned hot-dip galvanized steel sheet.

MODE FOR INVENTION

Hereinafter, exemplary embodiments in the present disclosure will be described in more detail through examples.

Examples

A steel slab having the steel composition illustrated in Table 1 below was prepared, and then a hot-dip galvanized or galvannealed steel sheet was manufactured using the steel slab in the manufacturing conditions illustrated in Table 2 below. In Table 1 below, Inventive Steels 1, 2, 4, 6, and 8 were used to manufacture hot-dip galvanized (GI) steel sheets, and Inventive Steels 3 and 5 were used to manufacture hot-dip galvannealed (GA) steel sheets. Comparative Steels 11 and 12 were used to manufacture GA steel sheets, and the remainder was used to manufacture GI steel sheets.

Physical properties or the like of the hot-dip galvanized steel sheets manufactured as described above were evaluated, and results thereof are illustrated in Table 3 below. Here, the purpose of the present disclosure is to fundamentally ensure aging-resistance properties of the steel sheet, because the steel sheet may have a yield ratio of 0.55 or less and a bake hardenability of 45 MPa or higher in a state of not being subjected to a skin pass rolling process and may not exhibit a YP-El phenomenon during a tensile test after being maintained at 100° C. for 1 hr.

Here, the tensile test on each specimen was conducted in a C direction, using JIS standards, a microstructure thereof was analyzed at a ¼t point of the thickness of the steel sheet, and results of the analysis were used as the fraction of the martensite phase as the second phase, including the ferrite phase as the main phase, in the microstructure. In detail, the area ratios of martensite were first calculated using an optical microscope by a Lepera corrosion method. Then, the martensite was observed again using a scanning electron microscope (SEM) (at a magnification of 3000 times), and the area ratios of martensite were precisely measured and corrected by a count point method.

Meanwhile, thin film specimens were manufactured, Mn concentrations wt % of each phase were measured at 10 points or more using a TEM by a point method, and the average Mn concentration wt % (a) in the martensite phase at a ¼t point of the base steel sheet and the average Mn concentration wt % (b) in the ferrite phase within 1 μm of the martensite phase were indicated as representative values.

TABLE 1

| Specimen No. | C | Mn | P | S | N | Cr | Sol. Al | B | Mo | Mneq | Mn/(1.15 × Cr) | Note |
|---|---|---|---|---|---|---|---|---|---|---|---|---|
| 1 | 0.0023 | 2.54 | 0.011 | 0.007 | 0.003 | 0.52 | 0.025 | — | 0.12 | 3.2 | 4.2 | Inventive Steel |
| 2 | 0.0045 | 2.21 | 0.008 | 0.005 | 0.004 | 0.83 | 0.032 | — | — | 3.2 | 2.3 | Inventive Steel |
| 3 | 0.0072 | 2.03 | 0.008 | 0.006 | 0.003 | 0.51 | 0.033 | 0.0008 | 0.03 | 2.6 | 3.5 | Inventive Steel |
| 4 | 0.0082 | 2.06 | 0.091 | 0.007 | 0.003 | 0.34 | 0.034 | — | — | 2.6 | 5.3 | Inventive Steel |
| 5 | 0.0078 | 2.08 | 0.013 | 0.003 | 0.003 | 0.68 | 0.028 | 0.0011 | — | 2.9 | 2.7 | Inventive Steel |
| 6 | 0.0093 | 2.08 | 0.021 | 0.004 | 0.004 | 0.46 | 0.045 | — | 0.05 | 2.7 | 3.9 | Inventive Steel |
| 7 | 0.011 | 1.69 | 0.018 | 0.005 | 0.004 | 0.54 | 0.053 | — | — | 2.6 | 3.0 | Inventive Steel |
| 8 | 0.010 | 1.92 | 0.013 | 0.004 | 0.005 | 0.51 | 0.031 | 0.006 | 0.16 | 2.5 | 3.3 | Inventive Steel |
| 9 | 0.017 | 1.93 | 0.011 | 0.006 | 0.003 | 0.35 | 0.033 | — | — | 2.4 | 4.8 | Comparative Steel |
| 10 | 0.023 | 1.75 | 0.006 | 0.005 | 0.003 | 0.21 | 0.032 | — | — | 2.0 | 7.2 | Comparative Steel |
| 11 | 0.033 | 1.73 | 0.006 | 0.004 | 0.002 | 0.031 | 0.041 | — | — | 1.8 | 48.5 | Comparative Steel |
| 12 | 0.052 | 1.68 | 0.007 | 0.006 | 0.003 | 0.028 | 0.045 | — | — | 1.7 | 52.2 | Comparative Steel |
| 13 | 0.0018 | 0.45 | 0.005 | 0.007 | 0.004 | 0.006 | 0.036 | — | — | 0.5 | 65.2 | Comparative Steel |

Mneq=Mn+2P+1.15Cr  [Relational Expression 1]

TABLE 2

| Classification | | Hot Rolling | | Cold Rolling and Annealing | | | | | | Microstructure | | | | Note |
|---|---|---|---|---|---|---|---|---|---|---|---|---|---|---|
| | | FDT | CT | Reduction Ratio | Annealing temperature | Primary Cooling Rate (° C./s) | Alloying Treatment | Secondary Cooling Rate (° C./s) | ① | ② | ③ | ④ | | |
| 1 | 1-1 | 921 | 574 | 68 | 773 | 3.7 | No | 5.2 | 96.4 | 1.8 | 95.5 | 0.82 | Inventive Example 1 |
| | 1-2 | 918 | 568 | 68 | 745 | 3.6 | No | 6.2 | 95.1 | 3.2 | 92 | 0.28 | Comparative Example 1 |
| 2 | 2-1 | 923 | 558 | 69 | 795 | 1.5 | No | 4.8 | 89.3 | 3.3 | 89 | 0.18 | Comparative Example 2 |
| | 2-2 | 931 | 586 | 71 | 796 | 4.2 | No | 4.8 | 96.2 | 1.7 | 92 | 0.78 | Inventive Example 2 |
| 3 | 3-1 | 918 | 630 | 75 | 789 | 3.9 | YES | 4.7 | 96.7 | 1.61 | 92 | 0.45 | Inventive Example 3 |
| | 3-2 | 915 | 648 | 72 | 805 | 4.1 | YES | 2.5 | 97.5 | 0.78 | 86 | 0.44 | Comparative Example 3 |
| 4 | 4-1 | 914 | 552 | 69 | 812 | 3.8 | No | 4.9 | 96.3 | 1.32 | 93 | 0.65 | Inventive Example 4 |
| | 4-2 | 921 | 435 | 67 | 821 | 3.4 | No | 5.6 | 96.2 | 1.78 | 91 | 0.63 | Comparative Example 4 |
| 5 | 5-1 | 928 | 632 | 69 | 835 | 4.2 | YES | 4.9 | 95.3 | 1.92 | 94 | 0.89 | Inventive Example 5 |
| | 5-2 | 932 | 725 | 72 | 836 | 4.1 | YES | 4.8 | 97.2 | 2.18 | 93 | 0.18 | Comparative Example 5 |
| 6 | 6-1 | 928 | 630 | 69 | 861 | 3.9 | No | 6.3 | 95.8 | 3.2 | 86 | 0.17 | Comparative Example 6 |
| | 6-2 | 918 | 589 | 69 | 797 | 4.2 | No | 6.2 | 97.2 | 1.48 | 93 | 0.35 | Inventive Example 2 |
| 7 | 7-1 | 919 | 586 | 73 | 785 | 3.8 | No | 4.9 | 94.8 | 1.93 | 93 | 0.44 | Inventive Example 6 |
| 8 | 8-1 | 921 | 652 | 71 | 824 | 3.6 | No | 4.7 | 96.2 | 1.82 | 91 | 0.85 | Inventive Example 7 |
| | 8-2 | 918 | 648 | 78 | 834 | 3.8 | No | 4.2 | 96.4 | 1.76 | 93 | 0.54 | Inventive Example 8 |
| 9 | 9-1 | 932 | 685 | 77 | 835 | 4.2 | No | 5.3 | 88.2 | 4.01 | 78 | 0.35 | Comparative Example 7 |
| 10 | 10-1 | 932 | 695 | 76 | 831 | 3.9 | YES | 5.2 | 87.5 | 5.34 | 76 | 0.45 | Comparative Example 8 |

TABLE 2-continued

| Classifi-cation | | Hot Rolling | | Reduction Ratio | Annealing temperature | Primary Cooling Rate (° C./s) | Alloying Treatment | Secondary Cooling Rate (° C./s) | Microstructure | | | | Note |
|---|---|---|---|---|---|---|---|---|---|---|---|---|---|
| | | FDT | CT | | | | | | ① | ② | ③ | ④ | |
| 11 | 11-1 | 928 | 596 | 78 | 778 | 4.1 | YES | 5.7 | 84.5 | 4.98 | 77 | 0.65 | Comparative Example 9 |
| 12 | 12-1 | 918 | 638 | 79 | 795 | 3.4 | No | 5.7 | 86.1 | 3.78 | 79 | 0.74 | Comparative Example 10 |
| 13 | 13-1 | 915 | 678 | 78 | 803 | 3.5 | No | 4.9 | 100 | 0 | 0 | — | Comparative Example 11 |

① Area ratio (%) of the ferrite phase
② Area ratio (%) of fine martensite having an average diameter of 1 μm or less
③ Occupation ratio P (%) of martensite present in the ferrite grain boundary as area % = {Pgb/(Pg + Pgb)} × 100
④ Difference between the average Mn concentration wt % (a) in the martensite phase at a 1/4t point of the base steel sheet and the average Mn concentration wt % (b) in the ferrite phase within 1 μm of the martensite phase = a-b ≥ 0.3 wt %

TABLE 3

| Classifi-cation | | YS (MPa) | TS (MPa) | EI (%) | BH 2% pre strain (170° C. × 20 min) | Aging YP-EI (100° C. × 1 hr) | YR (YS/TS) | Note |
|---|---|---|---|---|---|---|---|---|
| 1 | 1-1 | 189 | 389 | 42 | 52 | 0 | 0.49 | Inventive Example 1 |
| | 1-2 | 224 | 438 | 38 | 32 | 0 | 0.51 | Comparative Example 1 |
| 2 | 2-1 | 234 | 439 | 37 | 28 | 0 | 0.53 | Comparative Example 2 |
| | 2-2 | 187 | 392 | 42 | 53 | 0 | 0.48 | Inventive Example 2 |
| 3 | 3-1 | 178 | 384 | 42 | 52 | 0 | 0.46 | Inventive Example 3 |
| | 3-2 | 201 | 405 | 41 | 23 | 0 | 0.50 | Comparative Example 3 |
| 4 | 4-1 | 192 | 401 | 43 | 50 | 0 | 0.48 | Inventive Example 4 |
| | 4-2 | 235 | 441 | 36 | 43 | 0.2 | 0.53 | Comparative Example 4 |
| 5 | 5-1 | 196 | 401 | 43 | 48 | 0 | 0.49 | Inventive Example 5 |
| | 5-2 | 196 | 398 | 41 | 59 | 0.8 | 0.49 | Comparative Example 5 |
| 6 | 6-1 | 222 | 439 | 38 | 35 | 0 | 0.51 | Comparative Example 6 |
| | 6-2 | 187 | 389 | 42 | 49 | 0 | 0.48 | Inventive Example 2 |
| 7 | 7-1 | 173 | 374 | 44 | 46 | 0 | 0.46 | Inventive Example 6 |
| 8 | 8-1 | 192 | 401 | 42 | 52 | 0 | 0.48 | Inventive Example 7 |
| | 8-2 | 187 | 392 | 44 | 53 | 0 | 0.48 | Inventive Example 8 |
| 9 | 9-1 | 245 | 465 | 34 | 45 | 0 | 0.53 | Comparative Example 7 |
| 10 | 10-1 | 238 | 451 | 36 | 48 | 0 | 0.53 | Comparative Example 8 |
| 11 | 11-1 | 251 | 468 | 35 | 53 | 0.4 | 0.54 | Comparative Example 9 |
| 12 | 12-1 | 268 | 485 | 32 | 48 | 0.2 | 0.56 | Comparative Example 10 |
| 13 | 13-1 | 196 | 351 | 42 | 35 | 0.4 | 0.56 | Comparative Example 11 |

As illustrated in Tables 1 to 3 above, Inventive Examples 1 to 8 satisfying all of the steel composition and the manufacturing conditions, according to an exemplary embodiment in the present disclosure, may have a yield strength of 210 MPa or lower and a yield ratio of 0.55 or less before a skin pass rolling process. In addition, Inventive Examples 1 to 8 had BH properties of 45 MPa or higher, and did not exhibit YP-El at all during a tensile test after an artificial aging process (100° C., 1 hr). Thus, Inventive Examples 1 to 8 were excellent in terms of aging-resistance properties.

It can be seen in Table 3 above that physical properties required in an exemplary embodiment in the present disclosure may be fundamentally ensured in conditions in which the microstructure of the steel sheet may be composed of, by area %, ferrite of 95% or more and the remainder of the second phase, an occupation ratio of the martensite present in the crystal grains of the ferrite may be, by area %, 90% or more, and the difference between the average Mn concentration wt % (a) in the martensite phase at a ¼t point of the base steel sheet and the average Mn concentration wt % (b) in the ferrite phase within 1 μm of the martensite phase may be 0.3 wt % or more.

FIG. 1 is a graph illustrating the difference between the average Mn concentration wt % (a) in the martensite phase at a ¼t point of the base steel sheet and the average Mn concentration wt % (b) in the ferrite phase within 1 μm of the martensite phase, according to an exemplary embodiment in the present disclosure. FIG. 1 illustrates, as representative values, averages obtained by measuring Mn concentrations wt % of each phase at 10 points or more, using a TEM and a point method.

As illustrated in FIG. 1, it can be seen that when the difference between the average Mn concentration wt % (a) in the martensite phase at a ¼t point of the base steel sheet and the average Mn concentration wt % (b) in the ferrite phase within 1 μm of the martensite phase may be 0.3 wt % or more, a bake hardenability-type steel sheet having excellent aging-resistance properties required in an exemplary embodiment in the present disclosure may be manufactured. That is, the higher a degree of the hardness of the martensite phase is, the more consistent with a condition according to an exemplary embodiment in the present disclosure is. In order to increase the strength of the martensite phase itself, the content of Mn included in the martensite phase may be required to be higher than that of the ferrite phase therearound. As the strength of the martensite phase increases, it may be possible to relatively soften the ferrite phase therearound, so as to allow a steel sheet having a low yield strength and a low yield ratio and a bake-hardened steel having excellent aging-resistance properties to be manufactured. This is because as the strength of the martensite phase increases, the concentration (density) of solid solution C within the martensite phase may be high, so that C within the martensite phase may easily diffuse into the ferrite phase at a proper level of baking temperature, thus increasing bake hardenability. In this aspect, it may be advantageous in increasing bake hardenability that the difference between the Mn concentrations wt % in the martensite phase and the ferrite phase within 1 μm of the martensite phase is higher. When the Mn concentration difference is less than 0.3 wt %, C may not easily diffuse into the ferrite phase during a baking process, so that bake hardenability may be degraded. Thus, it may be preferable to control the Mn concentration difference to be 0.3 wt % or more.

Figure 2:
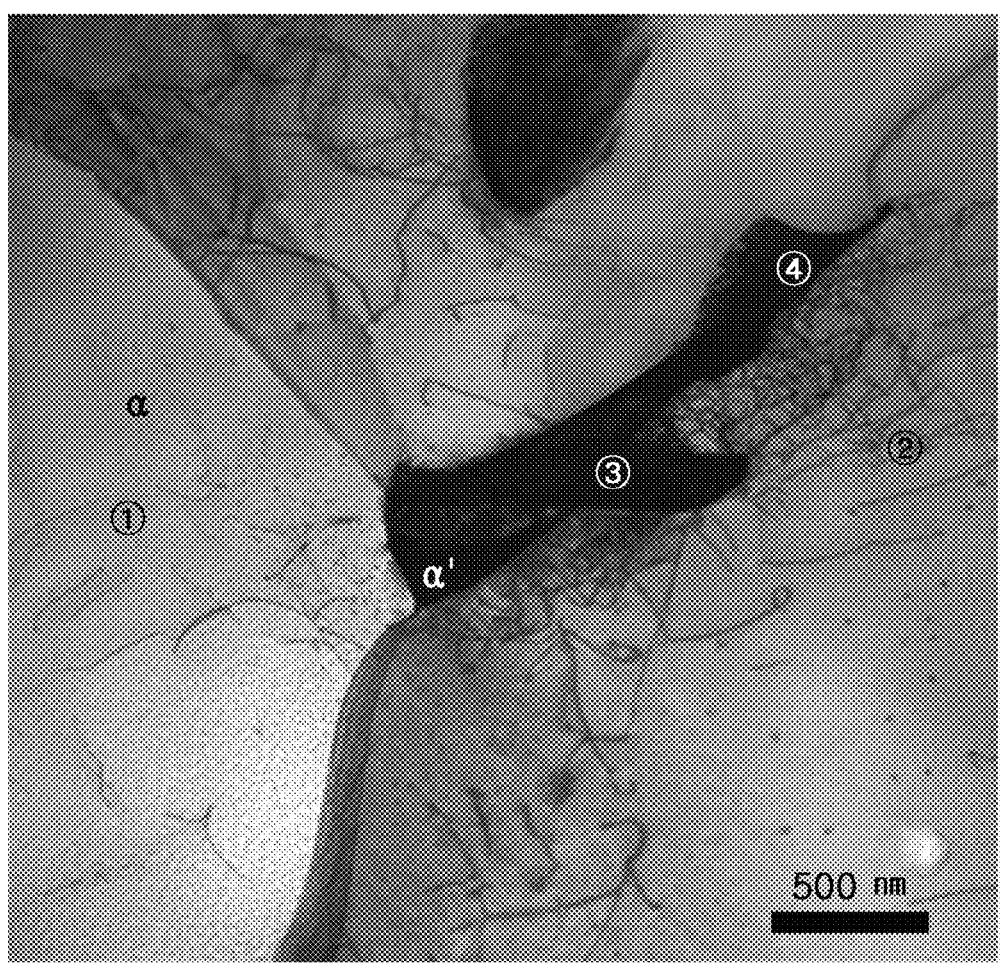
FIG. 2 is a transmission electron microscope (TEM) image of a microstructure having a martensite (M) phase formed around a ferrite (F) phase at a ¼t point of a base steel sheet, according to an exemplary embodiment in the present disclosure.

FIG. 2 is a TEM image of a microstructure having a martensite phase formed around a ferrite phase at a ¼t point of a base steel sheet, according to an exemplary embodiment in the present disclosure. It may be predicted that BH properties may be exhibited due to a close relation between a large amount of an electrical potential formed around the martensite phase and solid solution C present within the microstructure.

On the other hand, Comparative Examples 1 to 6, having a steel composition within the scope of the present disclosure but having manufacturing conditions therebeyond, fundamentally had fine martensite having an average diameter of 1 μm or less, having a high area ratio, or a ferrite phase having a low area ratio. Accordingly, excellent BH properties required in an exemplary embodiment in the present disclosure, were not ensured, or an aging problem occurred in a portion of Comparative Examples 1 to 6.

For example, in Comparative Example 6, when a high-temperature annealing process is performed at an annealing temperature beyond the scope of the present disclosure, the difference between the average Mn concentration wt % (a) in the martensite phase at a ¼t point of the base steel sheet and the average Mn concentration wt % (b) in the ferrite phase within 1 μm of the martensite phase may be low, so that the strength of the martensite phase may be decreased, thus ensuring no desired BH properties.

In addition, Comparative Examples 7 to 11 having a steel composition beyond the scope of the present disclosure fundamentally had fine martensite having an average diameter of 1 μm or less, having a high area ratio, and satisfied no characteristics of the steel composition itself, so as not to ensure characteristics required in an exemplary embodiment in the present disclosure.

In addition, Comparative Examples 7 to 10 are provided to manufacture a complex phase steel by increasing the content of C. However, Comparative Examples 7 to 10 fundamentally had a high content of C, so that the yield strength of steel was increased. Thus, it was impossible to ensure a yield strength of 210 MPa or lower before a skin pass rolling process, required in an exemplary embodiment in the present disclosure.

In addition, Comparative Examples 9 to 11 did not satisfy a Mneq value of [Relational Expression 1], so as not to ensure the physical properties required in an exemplary embodiment in the present disclosure. In addition, Comparative Examples 7 and 8 did satisfy [Relational Expression 1] and the relationship Mn(wt %)/(1.15×Cr(wt %)), but had the content of C in steel beyond the scope of the present disclosure, so as not to ensure the physical properties required in an exemplary embodiment in the present disclosure.

While exemplary embodiments have been shown and described above, it will be apparent to those skilled in the art that modifications and variations could be made without departing from the scope of the present invention as defined by the appended claims.

The invention claimed is:

1. A hot-dip galvanized steel sheet having improved aging-resistance and bake hardenability, the steel sheet comprising:
   a base steel sheet; and
   a galvanized layer formed on the base steel sheet,
   wherein the base steel sheet comprises:
   by wt %, 0.002-0.012% of carbon (C);
   1.6-2.7% of manganese (Mn);
   0.03% or less (excluding 0%) of phosphorus (P);
   0.01% or less (excluding 0%) of sulfur (S);
   0.01% or less (excluding 0%) of nitrogen (N);
   0.02-0.06% of aluminum (sol.Al);
   1.0% or less (excluding 0%) of chromium (Cr), with a remainder of iron and inevitable impurities;
   wherein the base steel sheet satisfies a relationship of $1.3 \leq Mn(wt\%)/(1.15 \times Cr(wt\%)) \leq 20.5$;
   wherein the base steel sheet satisfies $1.9 \leq Mneq \leq 3.9$, the Mneq being defined by the following Relational Expression 1:

$$Mneq = Mn + 2P + 1.15Cr; \qquad \text{[Relational Expression 1]}$$

wherein the base steel sheet comprises a microstructure having an area ratio of 95% or more of a ferrite phase and a remainder of a martensite phase;

wherein the martensite phase satisfies the following Relational Expression 2:

$$P(\%)=\{Pgb/(Pg+Pgb)\}\times 100 \geq 90\%,\qquad \text{[Relational Expression 2]}$$

where P(%) is an occupation ratio of martensite present in a ferrite grain boundary, Pgb is an occupation area of martensite present in the ferrite grain boundary, and Pg is an occupation area of martensite present within a ferrite grain; and wherein the base steel sheet satisfies the following Relational Expression 3:

$$a-b \geq 0.3 \text{ wt }\%,\qquad \text{[Relational Expression 3]}$$

where a is an average Mn concentration (wt %) in the martensite phase at a ¼ thickness point of the base steel sheet, and b is an average Mn concentration (wt %) in a ferrite phase within 1 μm around the martensite phase at the ¼ thickness point of the base steel sheet.

2. The hot-dip galvanized steel sheet of claim 1, wherein the base steel sheet further comprises: at least one of 0.003% or less (excluding 0%) of boron (B) and 0.2% or less (excluding 0%) of molybdenum (Mo).

3. The hot-dip galvanized steel sheet of claim 1, wherein the martensite phase includes a fine martensite phase having an average diameter of 1 μm or less, the fine martensite phase having an area % of 2% or less (excluding 0%).

4. The hot-dip galvanized steel sheet of claim 1, wherein the galvanized layer includes an alloying treated galvanized layer.

5. The hot-dip galvanized steel sheet of claim 1, wherein the base steel sheet comprises: by wt %, 0.004-0.01% of carbon (C).

6. The hot-dip galvanized steel sheet of claim 1, wherein the base steel sheet comprises: by wt %, 2.0-2.4% of manganese (Mn).

* * * * *